C. C. ZIMMERMAN.
RAIL SAW.
APPLICATION FILED APR. 25, 1918.
1,294,593.
Patented Feb. 18, 1919.
2 SHEETS—SHEET 2.
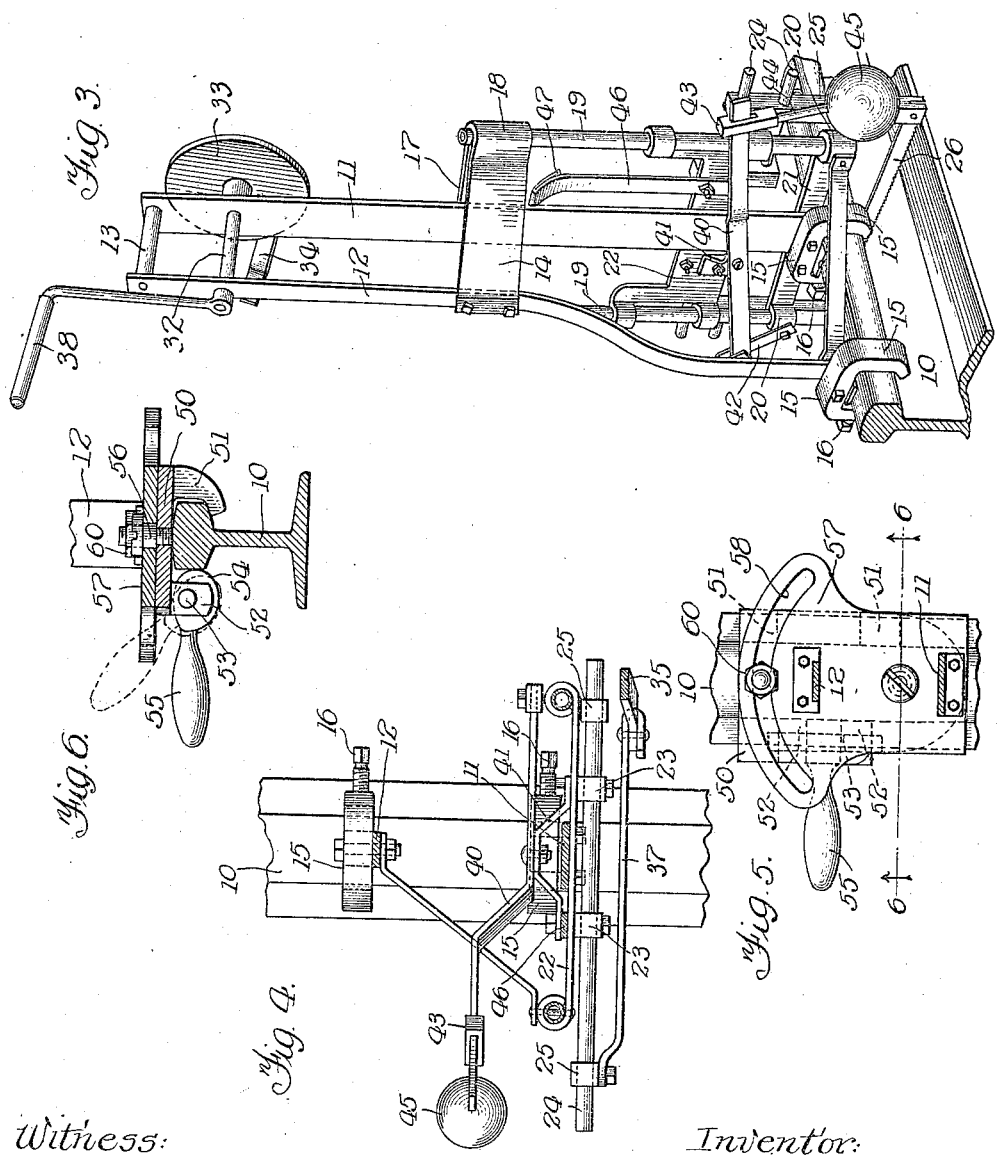
Witness:
Inventor:
Clarence C. Zimmerman,
By Pond & Wilson,
Attys.

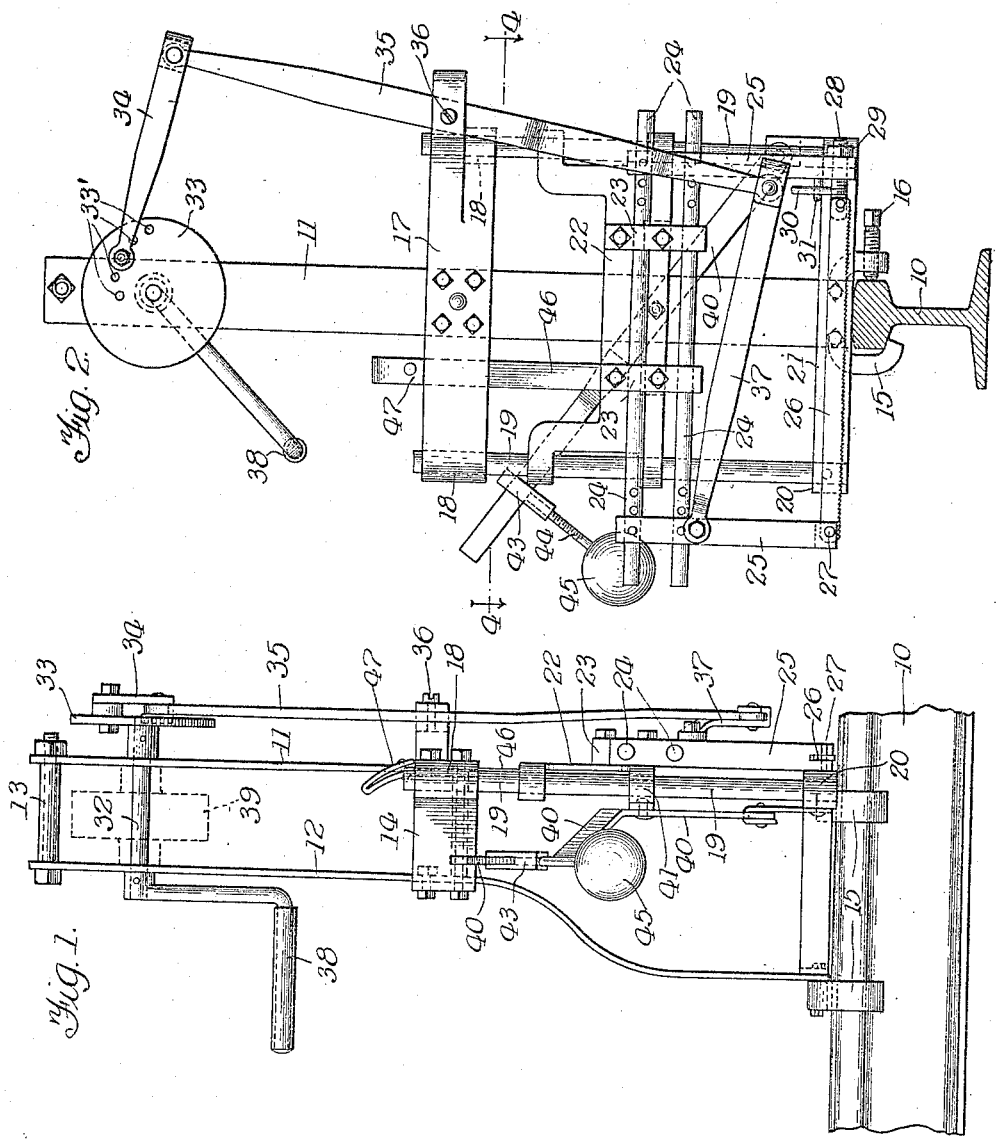

UNITED STATES PATENT OFFICE.

CLARENCE C. ZIMMERMAN, OF CHICAGO, ILLINOIS, ASSIGNOR TO NATIONAL SURFACE GUARD COMPANY, OF CHICAGO, ILLINOIS, A CORPORATION OF ILLINOIS.

RAIL-SAW.

1,294,593.                    Specification of Letters Patent.      Patented Feb. 18, 1919.

Application filed April 25, 1918. Serial No. 230,660.

*To all whom it may concern:*

Be it known that I, CLARENCE C. ZIMMERMAN, a citizen of the United States, residing at Chicago, in the county of Cook and State of Illinois, have invented certain new and useful Improvements in Rail-Saws, of which the following is a specification.

This invention relates to tools for cutting structural iron and steel bars and rails into suitable lengths, and in the embodiment of the invention herein shown and described is more particularly designed and adapted for cutting the rails of railway tracks, especially those that have been already laid.

Among the objects of the invention are, first, to provide a simple and practical rail saw which, for purposes of operation, may be readily mounted on the rail itself and be operated either by hand or by power; second, to provide a rail saw of the character mentioned, having provision for applying different weights or pressures, to the saw blade as the latter is operated; third, to provide a rail saw of the character mentioned readily adjustable to accommodate different lengths of saw blades; fourth, to provide a rail saw of the character mentioned equipped with means for adjusting the length of stroke of the saw as desired; fifth, to provide, in a rail saw of the character mentioned, means for conveniently supporting the saw blade in idle position above the rail; and sixth, to provide a rail saw capable of making either a straight transverse cut, or an oblique cut at any desired angle on the work; and, generally, to provide a strong, efficient, and easily manipulated rail saw of the character specified.

In the accompanying drawings I have illustrated a practical and workable embodiment of the invention, and referring thereto—

Figure 1 is a side elevation of the complete saw. Fig. 2 is a front elevation of the same. Fig. 3 is a rear perspective elevation. Fig. 4 is a sectional plan taken on the line 4—4 of Fig. 2. Fig. 5 is a plan detail view of a modified supporting base for the machine frame, adapting the latter to the turn so as to effect an oblique cut, and also showing a modified rail grip. Fig. 6 is a section on the line 6—6 of Fig. 5.

Referring to the drawings, 10 designates a rail of a railway track, on which my improved machine is adapted to be mounted for the purpose of cutting the same. The machine frame comprises principally a pair of uprights 11 and 12 suitably connected and spaced by a spacing rod 13 at their upper end, and by a brace 14 at substantially mid-length. To the lower ends of the uprights 11 and 12 are secured rail grips consisting of yokes 15 that straddle the tread of the rail and are provided at one end with clamping screws 16 adapted to cause the yokes to rigidly grip the tread of the rail.

Rigidly bolted to the face of the upright 11 is a cross-bar 17, on the two ends of which are formed vertical sockets 18 for a pair of upright rods 19. The lower ends of these rods are similarly supported in sockets 20 on the ends of a cross-bar 21 secured to the lower end of the upright 11. The vertical rods 19 form a guide and slideway for a carriage 22 that, in turn, carries on its forward face a pair of guide brackets 23 that slidingly support a pair of horizontal rods 24 that together constitute the upper transverse member of a saw frame. Adjustably secured to the rods 24 lengthwise of the latter are depending bars 25 constituting the end members of the saw frame, between the lower ends of which is secured the saw blade 26. One end of this blade is pinned in a slot in the lower end of one of the frame members 25 as shown at 27. The other end of the saw blade is similarly secured in the inner end of a bolt 28 mounted in the lower end of the other frame member, the saw being tensioned by a nut 29 on the outer end of the bolt 28. The bolt is held nonrotatable during the tensioning of the saw by a pin 30 carried by the bolt engaging a stop 31 secured in the rod 19.

The saw is reciprocated from a shaft 32 mounted in the upper portion of the frame through a crank disk 33 fast on said shaft, a link 34, a long lever 35 that is pivoted at 36 to an integral arm of the cross-bar 17, and a link 37 connecting the lower end of said lever to one of the saw frame members 25. The crank disk 33 is provided with a plurality of holes 33' spaced at different radial distances from the center, so as to vary the length of stroke of the saw. The shaft 32 may be actuated manually by a crank 38 or by power applied to a gear or pulley indicated in dotted lines at 39 in Fig. 1.

Means are provided for applying a downward pressure on the saw frame during the cutting of the rail. A gravity actuated device is preferably employed for this purpose in order to maintain a substantially constant pressure on the saw; and provision is made for effecting an adjustment of the gravity effect so as to apply greater or less pressure as may be desirable. The means herein shown for this purpose consists of a lever 40 that is pivoted intermediate its ends to a bracket 41 secured to the rear side of the saw carriage 22 (see Fig. 4). The lower end of the lever 40 is pivotally connected through a link 42, best shown in Fig. 3, to one of the end sockets 20 of the lower frame bar 21. The other arm of the lever 40 is off-set rearwardly, as shown in Fig. 4, and carries a slidable collar 43 having a tapped hole in its lower side into which is entered the threaded stem or shank 44 of a ball weight 45. The threaded stem 44 serves both as a carrier for the weight 45 and as a set screw for securing the collar 43 at any desired position on the lever 40 so as to vary the gravity effect transmitted to the saw carriage 22 and, through the latter, to the saw. Obviously, by adjusting the weight outwardly of the lever 40 the downward pressure is increased, and by adjusting it inwardly of the lever the downward pressure is decreased.

In order to support the saw from the frame in an elevated position above the work, I provide a vertical strap bar 46 that is bolted at its lower end to the carriage 22 and terminates at its upper end in a forwardly facing hook 47 (Fig. 3) that, in the raised position of the saw carriage, engages over the upper edge of the crossbar 17, as clearly shown in Figs. 1 and 2.

In operation, the machine is rigidly clamped to the tread of the rail, the saw carriage and saw being in the elevated position shown in Figs. 1 and 2. The hook 47 is then disengaged from the frame bar 17, which allows the saw blade 26 to drop into engagement with the top of the rail 10. The saw is then reciprocated either manually through the crank 38 or by power applied through the gear or pulley 39, and the weight 45 exerts a constant downward pressure on the saw blade, causing the latter to cut through the metal of the rail. The length of stroke may be adjusted as desired through connection of the link 34 to the crank disk 38 through any one of the holes 33'. Shorter or longer saw blades may be fitted to the saw frame by adjusting the end members 25 of the latter inwardly or outwardly of the upper frame members 24.

In cutting a railway rail, such as that herein shown, it may be desirable to increase the pressure on the saw blade while cutting through the tread and base of the rail, and to decrease the pressure while cutting through the relatively thin web. This is readily effected by adjustment of the weight 45 on the lever 40.

The machine as thus far described is adapted to make a straight transverse cut at right angles to the longitudinal axis of the rail. In Figs. 5 and 6 I have illustrated a modified form of base which permits the frame to be swiveled on a vertical axis so as to effect an oblique or miter cut, and also a modified clamping means which may, if desired, be used in the construction shown in Figs. 1 to 4 inclusive in lieu of the clamping screws 16 therein shown.

Referring to Figs. 5 and 6, 50 designates a base plate that is adapted to rest on the tread of the rail, and is provided on one side with down-turned hooks 51 engaging beneath one side of the tread and, on the other side, with depending lugs 52 in and between which is journaled a shaft 53, fast on which is a cam 54 having an operating handle 55. This cam, when swung downwardly, as shown by full lines in Fig. 6, binds against the adjacent side of the rail tread and, in coöperation with the hooks 51, locks the plate 50 rigidly on the rail. On the upper side of the plate 50 is an upstanding gudgeon 56, on which is swiveled a base plate 57 to which the lower ends of the frame uprights 11 and 12 are secured, as indicated in Fig. 5.

This base plate 57 is formed at one end with an arcuate slot 58, through which extends a threaded stud or bolt 59 carried by the lower plate 50, this stud 59 having a clamping nut 60, by which the two plates 50 and 57 may be rigidly united at any desired angle within the degree limits of the slot 58. This enables the entire frame to be adjusted angularly so as to effect oblique cuts on the rail.

It is believed that the construction, manner of use, and advantages of this invention will be readily understood and appreciated from the foregoing without further detailed description. Manifestly the structure may be modified in respect to details without altering its substantial character or sacrificing the advantages inherent therein; hence I reserve all such variations and modifications as fall within the spirit and purview of the invention as defined in the appended claims.

I claim:

1. In a rail saw, the combination of an upright frame structure having rail-clamping means at its lower end, a cross-bar rigidly secured to said frame structure, parallel rods carried by said cross-bar, a saw carriage mounted to slide on said rods, a slideway on said carriage, a saw-frame engaging said slideway, and operating means for said saw-frame mounted on said frame structure.

2. In a rail saw, the combination of an upright frame structure having rail clamping means at its lower end, a cross-bar rigidly secured to said frame structure, spaced vertical rods carried by said crossbar, a saw carriage mounted to slide vertically on said rods, a slideway on said carriage, a saw-frame engaging said slideway, a driving shaft journaled in the upper portion of said frame structure, and operating connections from said shaft to said saw frame.

3. In a rail saw, the combination of a frame, a vertical slideway on said frame, a saw carriage engaged with said slideway, a lever for depressing said carriage, a collar slidably mounted on one arm of said lever and having a tapped radial bore, and a weight having a threaded stem engaged with said bore and serving to both connect said weight to said collar and key said collar on said lever.

4. In a rail saw, the combination of a frame, a vertical slideway on said frame, a saw carriage mounted on said slideway, a saw frame comprising an upper horizontal member slidably engaged with said carriage and vertical depending end members secured at their upper ends to said horizontal member, and a saw-blade secured to and between the lower ends of said end members of the saw frame.

5. In a rail saw, the combination of a frame, a vertical slideway on said frame, a saw carriage mounted on said slideway, a saw frame comprising a pair of spaced horizontal rods slidably engaged with said carriage and vertical depending end bars secured at their upper ends to said rods, and a saw-blade secured to and between the lower ends of said end bars.

6. In a rail saw, the combination of a frame, a vertical slideway on said frame, a saw carriage mounted on said slideway, a saw frame comprising a pair of spaced horizontal rods slidably mounted on said carriage and vertical depending end bars secured at their upper ends to said rods and adjustable lengthwise of the latter, a saw-blade secured to and between the lower ends of said end bars, and means for tensioning said saw-blade.

7. In a rail saw, the combination with a frame carrying a saw and operating mechanism therefor, of a base for said frame adapted to rest on the rail, said base having on one side a rigid hook adapted to engage over one side of the rail and on its opposite side a pair of bearings, a shaft mounted in said bearings, a cam on said shaft engaging the opposite side of the rail, and a handle on said cam.

8. In a rail saw the combination with a plate, and means for clamping it on a rail, of a frame carrying a saw and operating mechanism therefor, said frame being vertically swiveled on said plate, and means for clamping said frame in any angularly adjusted position on said plate.

CLARENCE C. ZIMMERMAN.

Copies of this patent may be obtained for five cents each, by addressing the "Commissioner of Patents, Washington, D. C."